(12) United States Patent
Hoff et al.

(10) Patent No.: US 7,282,551 B2
(45) Date of Patent: Oct. 16, 2007

(54) THERMOPLASTIC BLOCK COPOLYMERS CONSISTING OF POLYALKYL(METH)ACRYLATE AND POLYAMIDE SEGMENTS AND THE USE THEREOF

(75) Inventors: Heinz Hoff, Tamins (CH); Botho Hoffmann, Domat/Ems (CH)

(73) Assignee: EMS-Chemie AG, Domat/Ems (CH)

(*) Notice: Subject to any disclaimer, the term of this patent is extended or adjusted under 35 U.S.C. 154(b) by 191 days.

(21) Appl. No.: 10/467,994

(22) PCT Filed: Feb. 21, 2002

(86) PCT No.: PCT/EP02/01858

§ 371 (c)(1),
(2), (4) Date: Oct. 14, 2003

(87) PCT Pub. No.: WO02/074836

PCT Pub. Date: Sep. 26, 2002

(65) Prior Publication Data

US 2004/0068071 A1    Apr. 8, 2004

(30) Foreign Application Priority Data

Feb. 23, 2001 (DE) ................. 101 08 911
Jul. 25, 2001 (DE) ................. 101 36 286

(51) Int. Cl.
*C08F 20/00* (2006.01)
*C08F 118/02* (2006.01)
*C08L 53/00* (2006.01)

(52) U.S. Cl. ............ 526/317.1; 526/319; 525/90
(58) Field of Classification Search ............ 526/317.1, 526/319; 525/90
See application file for complete search history.

(56) References Cited

U.S. PATENT DOCUMENTS 4,501,861 A * 2/1985 Woodbrey ............ 525/421

FOREIGN PATENT DOCUMENTS

| DE | 43 14 111 A1 | 11/1994 |
| DE | 196 24 813 A1 | 1/1998 |
| EP | 0 708 115 A3 | 5/1996 |

* cited by examiner

*Primary Examiner*—David W. Wu
*Assistant Examiner*—Michael Bernshteyn
(74) *Attorney, Agent, or Firm*—Bell, Boyd & Lloyd LLP

(57) ABSTRACT

Polyamide polyalkyl(meth)acrylate block copolymers which are built from polyamide generating monomers in addition to 15-70 weight percent polyalkyl(meth)acrylates as well as products produced from same. The block copolymers are produced by producing polyamide or copolyamide blocks with an average molar mass in the range between 500 and 5,000 g/Mol with an amino end group in a first polymerization or polycondensation step and degassing in order to reduce the water content; adding, in a second step, $\alpha,\omega$-functionalized polyalkyl(meth)acrylate diols; and fully condensing the reaction mixture into high-molecular block copolymer (A) at a reduce pressure in a further polycondensation step; discharging it, or further processing it into molding bodies.

23 Claims, No Drawings

THERMOPLASTIC BLOCK COPOLYMERS CONSISTING OF POLYALKYL(METH)ACRYLATE AND POLYAMIDE SEGMENTS AND THE USE THEREOF

BACKGROUND OF THE INVENTION

The invention relates to novel thermoplastic block copolymers that can be produced by condensation polymerization and that consist of poly(meth)acrylate and polyamide segments, to their production, and to the use thereof. The inventive block copolymers exhibit a unique combination of the characteristics of poly(meth)acrylates (PMMA) and polyamides, can be used as modifying agents both in polyamide and in poly(meth)acrylates, and act as compatibility promoters in blends or are tailor-made adhesion promoters in multilayer systems such as multilayer polymer pipes.

Polyamides are among the most important technical thermoplastics, with diverse applications in a wide variety of fields. This versatility results from the fact that polyamides are modifiable in manifold ways, which makes it possible to produce tailor-made products. Copolymer formation, besides its utility for introducing reinforcing and filling agents, blending with other polymers, and adding various additives, is an important means of purposefully influencing the characteristics of polyamides. The linear block polymers that are known from the literature are primarily those containing segments based on polyethers, polyesters, polysiloxanes, polyimides and polycarbonates, besides the polyamide segment (J. Stehlicek, J. Horsky, J. Roda, A. Moucha in "Lactam based Polyamides" Vol. 2, R. Puffr, V. Kubanek, Ed., CRC Press, Boca Raton 1991, 20ff). But few examples can be found of the combination of polyamides and segments based on vinyl monomers. One exception is block copolymers consisting of polyamide 6 and polystyrol, poly(butadiene co-acrylic nitrile)(Colloid Polym. Sci. (1989), 267(1), 9-15), poly(styrol co-butadiene), polybutadiene and polyisobutylene.

Hitherto, block copolymers consisting of polyamide and poly(meth)acrylate segments have been obtainable from high-molecular (i.e. oligomeric) polyamides only by means of radical polymerization of macromolecular initiators. The synthesis of these initiators from polyamide pre-condensers, usually furnished with amino end groups, is carried out either by conversion with suitably functionalized low-molecular azo or peroxo initiators (Polymer Journal 31 (10), 864-871), or by nitrosation of a commercial polyamide and subsequent photochemical rearranging in the corresponding high-molecular diazoester (J. Polym. Sci., Polym. Chem. Ed. (1980), 18(6), 2011-20; J. Polym. Sci., Polym. Chem. Ed. (1982), 20(7), 1935-9). It is thus possible to produce AB, ABA or, by nitrosation, segmented multiblock copolymers by thermally or photochemically induced radical mass polymerization or solution polymerization.

With the photochemically or thermally induced decomposition of the diazoester, biradicals usually emerge, which give rise to branchings and cross-linkings. Many of the products are thus rubbery and insoluble. The formation of graft polymers is unavoidable owing to the high transfer rate. Furthermore, the characteristics of these copolymers are determined almost completely by the vinyl components. The yield of conversion with MMA (methylmethacrylate) is insufficient. Whereas a nearly total conversion occurs for the reaction pair of polyamide 6/acrylic nitrile (or vinyl acetate), the conversion is only 25% for MMA.

In the case of polyamide oligomers with azo end groups, only AB or ABA block copolymers are obtainable. The conversions must be carried out in solution. The initiator effectiveness is very low, so that inconsistent products are formed. Owing to the required reaction procedure, limitations in the concentration, segment length, and composition of the polyamide precondensate can be expected, because these parameters directly determine the dissolving behavior of the components and determine the solution viscosity of the reaction mixture.

The polycondensation of a polymethacrylate macromonomer with polyamide generating monomers for producing graft copolymers was described for the first time by Y. Yamashita in Polymer Bulletin 5 (361-366). The PMMA macromonomer was obtained by the radical polymerization of MMA in the presence of thio amber acid as the chain transfer agent. The generating of the polyamide backbone was accomplished by catalyzed polycondensation with aromatic diamines and aliphatic dicarboxylic acids in solution.

Besides this, Y. Chujo et al. describes the use of 2-mercaptoethanol and 2-aminoethane thiol as the chain transfer agent for functionalizing PMMA oligomers in J. Polym. Sci., Part A: Polymer Chemistry 27, 2007-14 (1989). The generated monofunctional PMMA oligomers are converted into the corresponding PMMA dicarboxylic acid by subsequent reaction with trimellitic acid anhydride. Macromonomers are thus available for the polycondensation. The resulting copolymers are graft copolymers with a polyamide main chain and PMMA side chains.

By preforming the PMMA macromers, it is possible to avoid the complications that arise in the radical polymerization; however, the building of the aforementioned polyamide chains must also be performed in solution. But the use of the a-bifunctional macromers only makes possible the synthesis of graft copolymers.

Thermoplastic polyamide blends consisting of polyamide 6 and anionically produced block polymers based on polyamide 6 are described in U.S. Pat. No. 4,501,861. The oligomeric diols used there, which include poly(alkylacrylate), must be converted on both ends of the chain with an acyl lactam unit, in order to make possible incorporation during the anionic polymerization of capro lactam.

The anionic ring opening is limited to lactams and requires a high purity of the utilized components, particularly absolute anhydrousness. The diols must also be fully refunctionalized; otherwise, break-off centers for the anionic polymerization will be created, which result in a high residual lactam content and a low polymerization grade. Reproducibility is therefore a primary problem of this process as well.

SUMMARY OF THE INVENTION

It is thus an advantage of the invention to make available new polyamide polyalkyl(meth)acrylate block copolymers which avoid the abovementioned disadvantages of the prior art and can be produced by polycondensation.

The invention relates to polyamide polyalkyl(meth)acrylate block copolymers which are built from conventional polyamide generating monomers in addition to 15-70 weight percent polyalkyl(meth)acrylates.

The inventive block copolymers are produced by producing polyamide or copolyamide blocks with an average molar mass in the range between 500 and 5,000 g/Mol, preferably between 750 and 2,500 g/Mol, with an amino end group concentration of at most 50 mMol/kg, in a first polymerization or polycondensation step at temperatures between 180° and 300° C., a pressure between atmospheric pressure and 3×106 Pas (30 bars), potentially with the addition of component D provided that X═N in Formula (III), and degassing at least 0.5 hours at a pressure between 50 mbar and atmospheric pressure in order to reduce the water content; adding, in a second step, α,ω-functionalized polyalkyl (meth)acrylate diols with an average molar mass in the range between 600 and 5,000 g/Mol, preferably in the range between 900 and 2,500 g/Mol, as a solid substance, solution, or fusion [or: melt] with all or part of the diol component (III) provided that X═O in Formula (III), or, provided that X═O, converting component (III) into the DMMP polyester diol with the aid of the PMMA diol in a parallel condensation step; and fully condensing the reaction mixture into high-molecular block copolymer (A) in the presence of between 0.05 and 0.2 weight percent a catalyst at a temperature between 180° and 300° C. at a reduced pressure in a further polycondensation step; discharging it, or further processing it into molding bodies.

The invention also relates to thermoplastic multilayer compounds consisting of at least one layer of a molding material based on (co)polyamide, at least one layer of a molding material consisting of a thermoplastic material from the group consisting of polyalkyl(meth)acrylates, polycarbonates, or blends of polycarbonates with other plastics such as polyolefins, whereby the polyalkyl(meth)acrylates are homopolymers or copolymers wherein up to 50 Mol % of the methyl(meth)acrylate can be replaced by other monomers from the group consisting of butylmethacrylate, butylacrylate, methacrylic acid, itaconic acid, styrol, and maleic acid anhydride, the fluoropolymers or the perfluoridated polymers or mixtures of these compounds; and at least one intermediate layer based on an adhesion promoter molding material from the thermoplastic block copolymers. According to the invention, an alternative option for the adhesion promoting intermediate layer between layers (a) and (b) is a blend of the polymers that constitute layers (a) and (b), whereby at least one part of the blend can consist of the thermoplastic block copolymers. In a separate embodiment of the invention, the physical mixture (blend) contains at least 8% of the inventive thermoplastic block copolymers by weight. In another embodiment, the intermediate layer based on an adhesion promoting molding material can consist, up to 100 weight percent, of the thermoplastic block copolymers.

The inventive multilayer compounds can be utilized as structural components primarily in the automotive, electronics, and mechanical engineering industries. In particular, they can be utilized in the fabrication of fibers, films, molded bodies such as housings, housing parts of mobile radiotelephones, and as hot-melt adhesive. Their utilization as a multilayer pipe in the automotive field is particularly advantageous.

The invention also relates to multilayer polymer tubing or piping, which can also be corrugated in at least one subregion, consisting of an inner layer of fluoropolymers, an outer layer of polyamide, preferably polyamide 12 or polyamide 12 derivatives, and an intermediate adhesion promotion layer based on the thermoplastic block copolymers claimed in one of the claims 1 to 6. But a physical blend of the polymers forming the inner and outer layers can also be provided as an adhesion promoting layer, whereby at least one part can be replaced by the thermoplastic block copolymers claimed in one of the claims 1 to 6. This physical blend advantageously contains 8% of the inventive thermoplastic block copolymers by weight. Alternatively, 100% of the intermediate layer can consist of the thermoplastic copolymers.

The fluoropolymers which are utilized for the inner layer of the inventive multilayer polymer tubing or piping are selected from fluoropolymers based on tetrafluoroethylene (TFE), hexafluoropropylene (HFP) and vinylidene fluoride (VDF) and fluoropolymers based on tetrafluoroethylene (TFE), perfluoromethylvinylether (PMVE) and vinylidene fluoride (VDF). A terpolymer from tetrafluoroethylene, hexafluoropropylene, vinylidene fluoride (trade name: THV 500 G, manuf: 3M) is particularly preferred. An inner layer of PVDF is highly preferred.

Additional features and advantages of the present invention are described in, and will be apparent from, the following Detailed Description of the Invention and the figures.

DETAILED DESCRIPTION OF THE INVENTION

Polyamide Portion

Any conventional lactam, aminocarboxylic acid, dicarboxylic acid, or diamine pair can be used as the polyamide-building monomers. The monomers that are suitable building blocks for the polyamide segments come from the class of lactams having 6-12 C-atoms, for instance lauric lactam or the corresponding α, ω amino carboxylic acids with 6-12 C atoms, such as ω-aminolauric acid or the combination of aliphatic diamines with 2-12 C atoms and dicarboxylic acids with 2-44 C atoms and aliphatic and cycloaliphatic diamines with 2-18 C atoms such as dodecane diamine/dodecanoic diacid or dodecane diamine/sebacinic acid or dodecane diamine/C36 dimeric acid, and on the other hand, other monomers which are used for semi-aromatic polyamides. The polyamide component of the inventive block copolymers is preferably based on the following:

1) aliphatic homopolyamides such as PA 46, PA 6, PA 66, PA 69, PA 610, PA 612, PA 636, PA 810, PA 1010, PA 1012, PA 11, PA 12, PA 1212, or semi-aromatic polyamides such as PA 6I, PA 6T, PA 6I6T, PA 9T, PA 12T, as well as copolyamides and multipolyamides based on the dicarboxylic acids $C_2$-$C_{36}$ and diamines $C_2$-$C_{24}$ as well as lactam 6, lactam 12, isophthalic acid, terephthalic acid, and naphthalinedicarboxylic acid. The polyamide component can also be obtained by polycondensation of the corresponding salt of diamine and dicarboxylic acid.

For example, in an embodiment of the present invention, a polyamide dicarboxylic acid of the general formula HOOC—B—COOH is present. The polyamide dicarboxylic acid of this embodiment may be according to the Formula (IIa) or (IIb):

IIa:

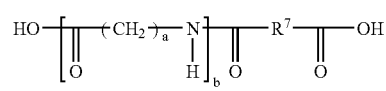

wherein a is a whole number from 5 to 11 and b is a whole number from 2 to 50, (IIb):

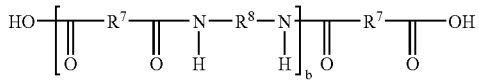

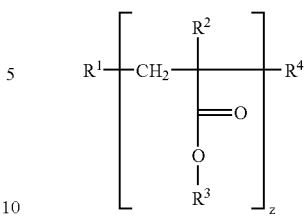

wherein b is a whole number from 2 to 40. In Formulae IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms. Further, $R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms.

2) amorphous polyamides or copolyamides which are built from branched or unbranched aliphatic diamines with 6-18 C atoms, such as 1,6-hexamethylenediamine, 2,2,4- or 2,4,4-trimethylhexamethylenediamine, cycloaliphatic diamines, such as 4,4' diamino-dicyclo-hexylmethane, 3,3'-dimethyl-4,4'-diaminodicyclohexylmethane, isophoronic diamine or aromatic diamines with 6-12 C atoms, such as m and p xylylenediamine and aliphatic, cycloaliphatic, or aromatic dicarboxylic acids with 6-12 C atoms.

3. Other possible polyamide-building polymers include transparent copolyamides with a glass temperature of 30-130° C., which are built from 90-45 weight percent lauric lactam which can be replaced by ο-aminocarboxylic acids with 9-12 C atoms or by aliphatic diamines with 9-12 C atoms in combination with aliphatic dicarboxylic acids with 9-12 C atoms and 55-10 weight percent other monomers for semi-aromatic polyamides consisting of an aliphatic diamine with 2-12 C atoms in an approximately equimolar ratio to diamine and at least one aromatic dicarboxylic acid, which can be replaced by at most 15 Mol % of another aliphatic dicarboxylic acid with 9-36 C atoms. These types of transparent copolyamides are described in EP 603 813 B1.

The inventive polyamide segments have average molar masses in the range between 500 and 5,000 g/mol, preferably in the range between 750-2,500 g/mol.

PMMA Portion

The polyalkyl(meth)acrylate segment for the inventive block copolymers that are obtainable by polycondensation is incorporated in the form of a α,ω-functionalized polyalkyl (meth)acrylate which carries end groups that are capable of condensation. These include α,ω-poly(meth)acrylate diols which are produced according to what is known as the "Iniferter technique" (C. P. Reghunadhan Nair et al. in J. Polymer Sci., Part A: Polymer Chemistry 27, 1795 (1989)), or those produced according to DE-A-43 14 111 or U.S. Pat. No. 5,900,464, or the α,ω poly(meth)acrylate dicarboxylic acids described in EP-A-0 708 115.

In an embodiment, these poly(meth)acrylate diols are present in the general formula HO—A—OH, or more particularly according to Formula I:

wherein z is a whole number from 4 to 50. In the formula, $R^1$ is selected from the group consisting of —S—$R^5$—OH, —C($C_6H_5$)$_2$—$R^5$—OH, -and S—C(S)—N($C_2H_5$)$C_2H_4$—OH, $R^2$ is H,$CH_3$, $R_3$ is an alkyl residue with 1-12 C atoms, which can be halogenated. $R^4$ is a residue selected from the group consisting of (1), (2), and (3):
 (1) —$R^5$—OH
 (2) —S—C(S)—N($C_2H_5$)$C_2H_4$—OH,
 (3) —$CH_2$—$CHR^2$—CO—O—$R^5$—OH,
wherein $R^5$ is a residue selected from the group consisting of (4), (5) and (6):
 (4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
 (5) a bivalent aliphatic ether residue —$R^6$—O—$R^{6'}$, whose residues —$R^6$ and $R^{6'}$ together have 4-20 C atoms,
 (6) a bivalent polyether residue according to the general formula —($C_nH_{2n}O$)$_m$—$C_pH_{2p}$, where n=2-4, m≧1, and p=2-4, and the poly(meth)acrylate (I) is partly or completely imidized.

The α,ω-functionalized polyalkyl(meth)acrylates that are utilized have average molar masses in the range between 600 and 5,000 g/mol, preferably in the range between 900 and 2,500 g/mol. The bifunctionality is at least 90%. The glass transition temperature is between −50 and +170° C.

Components A and B

In an embodiment, A and B are replacement characters that are utilized in the thermoplastic block copolymers of the general formula (A) as well as in the formulas HO—A—OH and HOOC—B—COOH, respectively.

A:

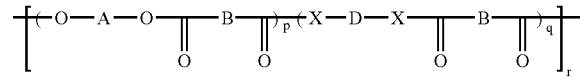

Formula HO—A—OH is a simplified representation of Formula I, which describes a poly(meth)acrylate diol. In formula HO—A—OH, both OH groups bonded to A correspond to the alcohol functions of $R^1$ and $R^4$ in Formula I. This is further illustrated in the following example.

For an embodiment where:
$R^1$=—S—$R^5$—OH
$R^2$=—$CH_3$
$R^3$=—$CH_3$
$R^4$=(1)=—$R^5$—OH
$R^5$=(4)=a bivalent aliphatic hydrocarbon residue with 2 C atoms=—$CH_2$—$CH_2$—
z=4 formula HO—A—OH describing a poly(meth)acrylate diol corresponds to the following formula, in which the replacement character A is identified:

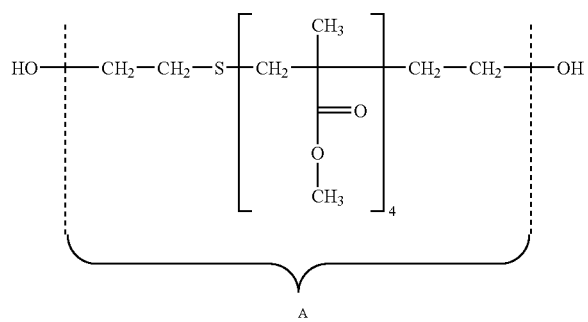

A

Accordingly, A represents the portion of the above Formula I (after $R^1$-$R^5$ are designated) between the two OH groups. As a result, A can change with the selection of the various $R^1$-$R^5$ constituents. Nevertheless, one having ordinary skill in the art can readily determine what A is, which is contingent on the choices for the $R^1$-$R^5$ constituents.

Formula HOOC—B—COOH is a simplified representation of Formulas (IIa) or (IIb), which describe a polyamide dicarboxylic acid. In formula HOOC—B—COOH, both COOH groups bonded to B correspond to the terminal acid functions in Formulas (IIa) and (IIb), respectively. This is further illustrated in the following example relating to Formula (IIa).

For an embodiment where:
a=5
b=2
$R^7$=a bivalent aliphatic hydrocarbon residue with 2 C atoms=—$CH_2$—$CH_2$— formula HOOC—B—COOH describing a polyamide dicarboxylic acid corresponds to the following formula, which the replacement character B is identified:

(2) an aliphatic olefin polymerisate with a molar mass of 500-4,000 g/mol, unsaturated as warranted, (3) a bivalent polyether residue according to the general formula —$(C_nH_{2n}O)_m$—$C_pH_{2p}$, whereby n=2-4, p=2-4 and the molar mass is 400-2,500 g/mol, (4) a polyester residue according to the general formula (IVa) or (IVb):

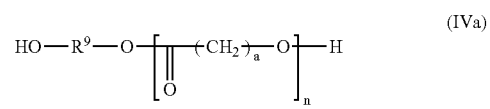

(IVa)

where n=a whole number from 3 to 20, or

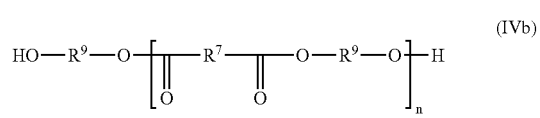

(IVb)

where a=a whole number from 5 to 11 and n=a whole number from 5 to 30, where $R^9$ is an aliphatic or cycloaliphatic hydrocarbon residue with 2-36 carbon atoms, and $R^7$ is a bivalent aliphatic, potentially unsaturated, hydrocarbon residue with 2-20 carbon atoms, a cycloaliphatic hydrocarbon with up to 36 C atoms, or an aliphatic aromatic hydrocarbon residue with 8-20 C atoms;

(5) an organic polysiloxane residue with a molar mass between 500 and 3,000 g/mol.

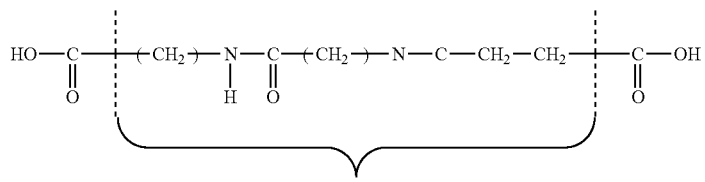

Accordingly, B represents the portion of the above Formula (IIa) (after a, b, $R^7$ and/or $R^8$ are designated) between the two COOH groups. As a result, B can change with the selection of the various a, b and $R^7$ constituents. Nevertheless, one having ordinary skill in the art can readily determine what B is, which is contingent on the choices for the a, b and $R^7$ (and/or $R^8$) constituents.

Component D a diol or diamine according to Formula (III) is utilized as a further building block of the block copolymers.

HX—D—XH (III), with X=NH or O where D is selected from the group consisting of (1), (2), (3), (4), (5):

(1) a bivalent aliphatic, potentially cycloaliphatic hydrocarbon residue with 4-36 C atoms, which may be unsaturated as warranted, Examples include butane diol, hexane diol, cyclohexanedimethanol, dodecane diol, dimeric diol, hexamethylenediamine, dodecanediamine, 2,2,4- and 2,4,4-trimethylhexamethylenediamine, 3,3'-dimethyl-4,4'-diaminodicyclohexylmethane, 4,4'-diaminodicyclohexylmethane, polyethyleneglycol diol, polypropyleneglycol diol, polytetramethylene diols, polyethyleneglycoldiamines, polypropyleneglycoldiamines, polytetramethylenediamines, polybutadiene diols, and poly(butadienecoethylene)diols, hydrated as warranted, polycaprolactone diols, polyester diols based on aliphatic or aromatic dicarboxylic acids and aliphatic or cycloaliphatic C2-C36 diols or aromatic C6-C18 diols.

Other examples of the substance group (III) HX—D—XH include:

| Examples for Component III (Component D) | Average Molar Mass [g/mol] | Functionality (XH) | Manufacturer |
|---|---|---|---|
| Kraton Liquid Polymer L-2203 | 3400 | OH | Shell |
| Pripol 2033 | 540 | OH | Uniqema |
| Hycar ATBN 1300x21 | 2400 | NH | BF Goodrich |
| Tegomer H—Si 2311 | 2500 | OH | Th. Goldschmidt AG |
| Desmophen 2000 MZ | 2000 | OH | Bayer |
| Tone Polyol 0230 | 1250 | OH | Union Carbide |
| Priplast 3197 | 2000 | OH | Uniqema |

The first 3 products comprise a pure C chain, while the last 3 examples are copolyester diols. Tegomer H—Si 2311 is a polysiloxane diol.

The invention also relates to the utilization of the block copolymers for producing fibers, films, and molded bodies, for instance of monolayer or multilayer pipes as well as hot-melt adhesives for textiles and technical applications.

It is also possible to use the inventive block copolymers as adhesives for joining housing parts such as housings for mobile radiotelephones. It has long been customary to produce displays for mobile radiotelephones from PMMA, whereas the housing consists of polycarbonate (polycarbonate resins are used for their excellent heat resistance, excellent impact strength, and their good dimensional stability) or ABS. The two parts are then glued together with the aid of glues such as polyurethanes. However, due to increased demand, it is necessary to produce housings from recyclable polyamide materials such as Grilamid TR90. But it has not been possible hitherto to glue such a Grilamid TR90 or polycarbonate housing part to a PMMA display. This is possible for the first time with the aid of the novel inventive block copolymers. A PMMA display can be glued to a housing made of Grilamid TR90 so as to form a splash-proof bond.

The inventive subject matter comprises, among other things, thermoplastic multilayer compounds made of polyamides and polyalkyl(meth)acrylates and polycarbonates and fluoropolymers as well as copolymers and blends based on the cited groups of substances.

The inventive thermoplastic multilayer compound consists of

A: at least one layer of (co)polyamide and

B: at least one layer of a thermoplastic material, selected from the group consisting of polyalkyl(meth)acrylate, the polycarbonate, the fluoropolymer or perfluoridated polymers, C: at least one adhesion promoter adjoining layers A and B, whereby the layers are joined non-positively, and the block copolymer claimed in one of the claims 1 to 6 is used as adhesion promoter.

Preferred Inventive Embodiments:

1.

Multilayer compound that is produced by injection molding or extrusion, in which the layers A and B are polyamide 12 and PMMA.

2.

Multilayer compound that is produced by injection molding, extrusion, calendering, or sealing, in which the layers (a) and (b) are a transparent polyamide and PMMA or a PMMA copolymer or polycarbonate. The transparent polyamides that are used exhibit a transparency of at least 80% in the wavelength region of visible light. Amorphous polyamides from terephthalic acid and the isomeric blend of 2,2,4- and 2,4,4-trimethylhexamethylenediamine, a copolyamide from isophthalic acid, 3,3'-dimethyl-4,4'-diaminodicyclohexylmethane and lauric lactam, and a polyamide from 1,12-dodecanedicarboxylic acid and 4,4'-diaminodicyclohexylmethane or 3,3'-dimethyl-4,4'-diaminodicyclohexylmethane are particularly preferred.

The layer C between the layers A and B can comprise other functions besides the adhesion promoting action. With the incorporation of UV absorbing, photochromatic, polarizing or thermotropic substances in layer C, the multilayer compound can be utilized as a functional unit in optical applications. It is also imaginable to use a layer that has been functionalized this way as a layer that seals to the inside or the outside. Depending on requirements, adjusting the segment density ratio can instead lend the block copolymer the typical properties of the underlying polyamide, or of P(M)MA.

The scratch resistance of a structural component made of transparent polyamide (PA) can be improved by applying a PMMA outer layer. Conversely, an outer layer of transparent polyamide lends the multilayer compound a good stress resistance and chemical resistance. In either case, a layer that transmits force and promotes adhesion must be used owing to the incompatibility of the polyamide and P(M)MA layers. Utilizing polymethacrylimide (PMI) instead of PMMA makes it possible to realize applications which allow appreciably higher continuous service temperatures. The partial or complete imidisation of the (meth)acrylate component in the block copolymer increases its temperature resistance and appreciably improves compatibility to PMI.

Layer B in embodiments 1) and 2) is composed of polyalkyl(meth)acrylates with 1-12 C atoms in the hydrocarbon chain of the alkyl residue, which may be fully or partly fluorinated. The polyalkyl(meth)acrylates have a melt flow index between 0.5 and 30 g/10 min, measured at 230° C. with a load of 3.8 kg. Polymethylmethacrylate and polybutylmethacrylate are particularly preferred. But copolymers of the polyalkyl(meth)acrylate can also be utilized. Up to 50 Mol % of the methylmethacrylate can be replaced by other monomers such as butylmethacrylte, butlacrylate, methacrylic acid, itaconic acid, styrol, maleic acid anhydride. Polymers that are utilized for layer B can also contain stabilizers, processing aids, impact strength modifiers, fillers, and other common additives in the usual amounts.

3.

Multilayer compound that is produced by injection molding or extrusion, wherein layers A and B are polyamide 12 and PVDF. Owing to the good blocking characteristics of PVDF relative to various fuels, a three-layer pipe with an inner layer of PVDF, a middle layer of the inventive block copolymer, and an outer protective layer based on polyamide 12 can be used in automobiles as a fuel line. The inner layer of the inventive polymer line or tubing is inert with respect to the transported medium; the outer layer is resistant to pressure and mechanical influences. The layer thickness of the inventive tubing or piping is not critical. Preferably, the outer layers are in the range between 0.2 and 0.8 mm; the adhesive layers are in the range between 0.05 and 0.3 mm; and the inner layers are in the range between 0.01 and 0.7 mm. As described above, the wall of the tubing or piping can also be provided with a ring shaped or spiral shaped arch, the inner layers can be furnished with carbon black or carbon fibrils for antistatic protection, and the outer layers can be modified with softeners or other modifiers according to the prior art. Length stability can be achieved by adding glass fibers.

The inventive multilayer polymer lines can be corrugated in one portion, with the rings formed by the corrugations extending around the axis of the piping, whereby the corrugations can be formed at least partly in an oval shape or in the shape of an ellipse or the shape of a circle that is flattened on one side. Such geometries, i.e. the formation of corrugations of piping, are described in DE-A-44 32 584, for example.

The inventive polymer line can be produced by coextrusion of a polymer pipe and subsequently, as warranted, formation of the corrugations including the flattening, if provided, by suction molding or blow molding. But the inventive polymer line can also be produced by extrusion blow molding, coextrusion blow molding, or sequential blow molding with or without tube manipulations.

4.

Multilayer compound that is produced by extrusion wherein a non-positive joint is produced between the cladding of a polymer optical fiber and the adjoining protective sheathe. The at least single-layer protective cladding of the plastic optical fiber waveguide is based on polyamide 12 or polyamide elastomers or polyamide 12 copolymers or blends based on polyamide 12 or thermoplastic polyurethanes, which can also be flame-retardant.

If good overall performance of the wrapped plastic optical fiber waveguide is to be achieved, the core and cladding of the plastic optical fiber waveguide may not soften during the coating process. Any uncontrolled deformation or damaging of the plastic optical fiber waveguide or the cladding unavoidably increases the attenuation, so that the signal range becomes insufficient. Migrating components from the layers adjoining the plastic optical fiber waveguide, which alter the index of refraction of the cladding, must by absolutely avoided, because this adversely affects the total reflection and thus the signal transmission. The block copolymer claimed in claim 1 contains only a very small concentration of residual monomers and no softeners. The adhesion promoting block copolymer claimed in claim 1 can be set such that, despite the relatively low processing temperature, good flow behavior is produced, which leads to a smooth and thin layer which adheres uniformly well to the plastic optical fiber waveguide. Thanks to its unique characteristic, good to very good adhesion values are achieved with the inventive adhesion promoter on nearly all commercial plastic optical fiber waveguides, whose claddings vary widely with respect to chemical composition (PVDF, fluoro copolymers, semi-fluorinated P(M)MAs or (M)MA copolymers, epoxilated polymers). Owing to the variable composition in the polyamide components, very good adhesion is also achieved to various polyamides, PA elastomers and copolymers, PA olefin blends, or polyurethane as the outer or middle layer.

Optical leads of the type described above and the materials utilized are described in WO 00/60382, which is hereby referenced.

The inventively utilized polyamides can also contain stabilizers, processing aids, conventional impact strength promoters, softeners, and other common additives in the usual amounts.

The block copolymers claimed in claim 1 and the molding materials produced therefrom are utilized as adhesion promoters, which make a non-positive joint with the adjacent layers in the fabrication of the multilayer compounds (extrusion, injection molding, sealing). If the polyamide component is suitably selected, the transparency of the multilayer compound is reduced negligibly if at all.

The production of the thermoplastic multilayer compounds can occur in one stage or several stages.

The invention will now be described in several examples, which are not limiting.

EXAMPLE 1

308.45 g aminododecanoic acid, 62.0 g of a polypropyleneglycoldiamine with an average molar mass of 380 g/mol, and 82.25 g adipic acid are condensed into a prepolymer with acid end groups at temperatures up to 260° C. Next, the temperature is reduced to 220° C., and 409.09 g PMMA diol with $M_n$=900 g/mol and 1.00 g monobutylstannic acid are added. Immediately after that, the reactor is sealed, and the pressure is reduced (<10 mbar). After 3.5 h the esterification is ended by breaking the vacuum, and the block polymer is discharged.

EXAMPLE 2

375.55 g aminododecanoic acid, 44.50 g of a polytetrahydrofuranic diamine ($M_n$=950 g/mol) and 57.43 g adipic acid are condensed into a polyetheramide prepolymer at temperatures up to 260° C. The temperature is then reduced to 200° C., and 355.26 g PMMA diol with $M_n$=900 g/mol and 1.00 g monobutylstannic acid are added. The reactor is then immediately sealed, and the pressure is reduced (<10 mbar). After 3.5 h, the esterification is ended by breaking the vacuum, and the bock polymer is discharged.

EXAMPLE 3

4.00 kg lauric lactam are converted into a polyamide 12 precondensate with an average molar mass of 750 g/mol by adding 1.14 kg terephthalic acid and 2.05 kg water at temperatures up to 300° C. and a pressure of 20 bar. After the temperature of the precondensate melt is reduced to 230° C., 3.09 kg of a PMMA diol with an average molar mass of 900 g/mol, 1.88 kg dimeric diol and 14 g monobutylstannic acid are added. Immediately after that, the reactor is sealed, and the pressure is reduced below 10 mbar. After the prescribed torque of 30 Nm is achieved, the esterification is stopped by breaking the vacuum, and the block polymer is discharged.

EXAMPLE 4

Polymerize 5.00 kg lauric lactam, adding 1.00 kg terephthalic acid and 2.40 kg water (pressure phase: 280-300° C., 17-23 bar, 3 h, expansion and degassing at 260° C.). Reduce the temperature to 230° C. and add 2.70 kg PMMA diol with $M_n$=900 g/mol, 1.65 kg dimeric diol and 17 g tetra-n-propylzirconate as 65% solution in n-propanol. Immediately seal the reactor and reduce the pressure (<10 bar). After the desired torque is reached, stop esterification by breaking the vacuum, and discharge and granulate the block polymer.

EXAMPLE 5

Polymerize 6.00 kg lauric lactam, adding 0.75 kg terephthalic acid and 2.70 kg water (pressure phase: 280-300° C. and 17-23 bar, expansion and degassing at 260° C.). Then reduce the temperature to 240° C. and add 2.03 kg PMMA diol with $M_n$=900 g/mol, 1.24 kg dimeric diol and 12 g Metatin S26 (monobutylstannic acid). Immediately seal the reactor and reduce the pressure (<10 mbar). After the desired torque is achieved, stop the esterification by breaking the vacuum, and discharge the block polymer.

EXAMPLE 6

Polymerize 3.78 kg lauric lactam, adding 1.07 kg terephthalic acid and 1.90 kg water (pressure phase: 270-310° C. and 17-23 bar, expansion and degassing at 260° C.). Reduce the temperature to 230° C., and add 4.66 kg PMMA diol with $M_n$=900 g/mol, 0.89 kg dimeric diol, and 17 g tetra-n-butylzirconate in an n-butanol solution. Immediately seal the reactor and reduce the pressure (<10 mbar). After the desired torque is achieved, stop the esterification by breaking the vacuum, and discharge and granulate the block polymer.

EXAMPLE 7

Polymerize 4.00 kg lauric lactam, adding 1.14 kg terephthalic acid and 2.05 kg water (pressure phase: 270-300° C. and 17-20 bar, expansion and degassing at 260° C.). Reduce the temperature to 225° C. and add 4.94 kg PMMA diol with $M_n$=900 g/mol, 0.94 kg dimeric diol and 18 g tetra-n-propylzirconate dissolved in n-propanol. Immediately seal the reactor and reduce the pressure (<10 mbar). After the desired torque is achieved, stop the esterification by breaking the vacuum, and discharge and granulate the block polymer.

EXAMPLE 8

Polymerize 3.60 kg lauric lactam, adding 1.02 kg terephthalic acid (pressure phase: 300° C. and 20 bar, expansion and degassing at 260° C.). Reduce the temperature to 230° C. and add 3.89 kg PMMA diol with $M_n$=900 g/mol, 1.85 kg polybutylmethacrylate diol with $M_n$=1,000 g/mol, 0.17 kg dimeric diol, and 12 g stannic dioctoate. Immediately seal the reactor and reduce the pressure (<10 mbar). After the desired torque is achieved, stop the esterification by breaking the vacuum, and discharge the block polymer.

EXAMPLE 9

Polymerize 4.00 kg lauric lactam, adding 1.14 kg terephthalic acid and 2.05 kg water (pressure phase: 300° C. and 20 bar, expansion and degassing at 260° C.). Reduce the temperature to 230° C. and add 3.39 kg PMMA diol with $M_n$=900 g/mol, 1.88 kg dimeric diol and 17 g n-butylpolytitanate. Immediately seal the reactor and reduce the pressure (<10 mbar). After the desired torque is achieved, stop the esterification by breaking the vacuum, and discharge and granulate the block polymer.

EXAMPLE 10

Condense 389.49 g aminododecanoic acid and 52.46 g adipic acid at temperatures up to 260° C., forming a PA-12 precondensate. Reduce the temperature to 220° C. and add 296.76 g PMMA diol with $M_n$=900 g/mol, 83.45 g polytetrahydrofuranic diol with $M_n$=1,000 g/mol and 1.36 g tetra-n-propylzirconate dissolved in n-propanol. Immediately seal the reactor and reduce the pressure (<10 mbar). After the desired torque is achieved, stop the esterification by breaking the vacuum, and discharge the block polymer.

EXAMPLE 11

Condense amorphous polyamide oligomer with an average molar mass of 2,000 g/mol and an amino end group concentration of 50 mmol/kg, 1.27 kg 3,3'-dimethyl-4,4'-diaminodicyclohexylmethane, 1.23 kg dodecanoic diacid and 0.21 kg isophthalic acid into an amorphous PA precondensate at temperatures of 270° C. At the end of the condensation, discharge the condensate and reduce it by means of a crushing machine. The amorphous PA precondensate has a solution viscosity of 1.15 (0.5% in m-cresol) and a glass transition temperature of 120° C.

EXAMPLE 12

Polymerize 460.00 g amorphous PA precondensate from Example 11 with 195.90 g PMMA diol with $M_n$=900 g/mol, 33.30 g polytetramethyleneglycol with an average molar mass of 980 g/mol and 1.20 g of a tetra-n-propylzirconate dissolved in n-propanol under reduced pressure (<10 mbar). After the desired torque is reached, the esterification is stopped by breaking the vacuum, and the block polymer is discharged.

EXAMPLE 13

Convert 2.63 kg 3,3'-dimethyl 4,4'-diaminodicyclohexylmethane, 2.54 kg dodecanoic diacid, and 0.95 kg isophthalic acid into an amorphous PA precondensate at temperatures of 250-280° C. Reduce the temperature to 230° C. and place the precondensate in a melt mixture, which is preheated to 200° C., of 2.58 kg PMMA diol with $M_n$=900 g/mol, 1.57 kg dimeric diol and 24 g of an esterification catalyst. After unifying the components, immediately seal the reactor and reduce the pressure to 5-20 mbar. Upon achieving the desired torque of 30 Nm after 2 hours in the vacuum, stop the esterification by breaking the vacuum, and discharge and granulate the block polymer.

EXAMPLE 14

Convert 2.54 kg 3,3'-dimethyl-4,4'-diaminodicyclohexylmethane, 2.46 dodecanoic diacid, and 0.42 kg isophthalic acid into an amorphous polyamide (PA) precondensate with an average molar mass of 1,000 g/mol at temperatures between 230 and 280° C. and normal pressure. Before unifying the precondensate with a melt of 1.70 kg PMMA diol with $M_n$=900 g/mol, 0.35 kg dimeric diol and 24 g of an esterification catalyst, reduce the temperature of the precondensate melt to 230° C. Immediately close the reactor and initiate the polymer building by reducing the pressure. Upon achieving a torque of 25 Nm after approx. 2 h at a pressure of 5-10 mbar, stop the esterification by breaking the vacuum. Discharge and granulate the block polymer.

EXAMPLE 15

Produce an amorphous polyamide oligomer by converting 3.05 kg 3,3'-dimethyl-4,4'-diaminodicyclohexylmethane and 3.67 kg dodecanoic diacid at temperatures of 230-270° C. under normal pressure. After cooling the precondensate melt to 230° C., add in a mixture, which has been tempered to 230° C., consisting of 2.06 kg PMMA diol with $M_n$=900 g/mol, 0.43 kg dimeric diol and 20 g tetra-n-butylzirconate dissolved in n-butanol. Immediately seal the reactor and reduce the pressure (<10 mbar). After the desired torque is achieved, stop the esterification by breaking the vacuum, and discharge and granulate the block polymer.

TABLE 1

Composition and Analytical Results of the Polyamide-Polymethylmethacrylate Copolymers: Examples 1 to 10 and 12 to 15

| Ex | PA Component Type | Conc[4] | HX-D-XH Type | Conc[4] | $\eta_{rel}$[3] | $T_E$[6] [° C.] | Modulus of Elasticity [MPa] | RF[1] [MPa] | RD[2] % |
|---|---|---|---|---|---|---|---|---|---|
| 1 | Mod. PA-12 | 50.2 | PPG diamine[7] | 8.4 | 1.70 | 140 | 950 | 22 | 200 |
| 2 | Mod. PA-12 | 54.9 | PTHF diamine[8] | 5.8 | 1.71 | 150 | 1220 | 24 | 170 |
| 3 | PA-12 | 50.7 | C36-diol | 18.6 | 1.77 | 130 | 230 | 25 | 150 |
| 4 | PA-12 | 57.9 | C36-diol | 15.9 | 1.56 | 140 | 300 | 22 | 120 |
| 5 | PA-12 | 67.2 | C36-diol | 12.4 | 1.50 | 150 | 530 | 26 | 210 |
| 6 | PA-12 | 46.5 | C36-diol | 8.5 | 1.50 | 130 | 600 | 28 | 160 |
| 7 | PA-12 | 46.6 | C36-diol | 8.5 | 1.44 | 130 | 520 | 23 | 220 |
| 8 | PA-12 | 43.8 | BD1000[9] | 17.5 | 1.50 | 130 | 520 | 22 | 190 |
| 9 | PA-12 | 49.2 | C36-diol | 18.0 | 1.46 | 130 | 240 | 25 | 265 |
| 10 | PA-12 | 51.8 | poly-THF[10] | 10.6 | 1.53 | 150 | 700 | 24 | 125 |
| 12 | amorphous PA | 66.9 | poly-THF | 4.8 | 1.50 | 120 | 1960 | 49 | 10 |
| 13 | amorphous PA | 57.8 | C36-diol | 15.8 | 1.56 | 90 | 1470 | 29 | 7 |
| 14 | amorphous PA | 70.9 | C36-diol | 4.9 | 1.48 | 120 | 1890 | 33 | 5 |
| 15 | amorphous PA | 71.4 | C36-diol | 4.9 | 1.62 | 110 | 1760 | 48 | 6 |

[1]RF = tear strength
[2]RD = elongation at break
[3]$\eta_{rel}$ = 0.5 m-cresol (DIN 53727)
[4]wt.-%
[5]wt.-%
[6]$T_E$ = $T_m$ for crystalline PA 12 or $T_g$ for amorphous PA
[7]PPG diamine = polypropyleneglycoldiamine
[8]PTHF diamine = polyoxytetramethylenediamine
[9]BD1000 = polybutylmethacrylate diol
[10]poly-THF = polytetrahydrofurandiol

EXAMPLE 16

For purposes of testing the adhesiveness of the bond, two-part DIN tensile bars were prepared on an Arburg Allrounder 350-210-750 and subjected to a tensile test.

Inserts were produced from the inventive block polyester amides, onto which the corresponding homopolymers were sprayed. The processing temperatures were selected such that a partial melting of the inserts on the common contact surface was possible. Table 2 summarizes the tear strengths determined in the tensile test according to DIN 53455.

Grilamid L16 is a low-viscosity polyamide 12, and Grilamid L20 is a mid-viscosity polyamide 12 manufactured by EMS Chemie. Grilamid L16 LM is a special PA 12 type for cable wrapping.

Grilamid ELY 60 is a copolyamide manufactured by EMS Chemie based on lactam 12, polyetherdiamine and dimerized fatty acid with a melting point of approx. 160° C.

Solef 1008 is a polyvinylidenefluoride made by Solvay with an MVI of 8 g/10 min measured at 230° C. and a load of 5 kg.

TABLE 2

Adhesiveness between the polyamide polymethylmethacrylate copolymers and various polymers: Tear strength of the two-part tensile bars in [MPa]

| Ex. | Grilamid L16 | Grilamid ELY60 | Solef | Riaglas 09000ST | Grilamid L20 | Grilamid TR55 | Grilamid TR70 | Grilamid TR90 |
|---|---|---|---|---|---|---|---|---|
| 3 | 9 | 12 | 7 | 8 | no test | no test | no test | no test |
| 4 | 15 | 11 | 10 | 6 | no test | no test | no test | no test |
| 5 | 13 | 9 | 7 | 7 | no test | no test | no test | no test |
| 6 | 19 | 12 | 9 | 8 | no test | no test | no test | no test |
| 8 | 9 | 8 | 6 | 8 | no test | no test | no test | no test |
| 9 | 16 | 14 | 11 | 14 | no test | no test | no test | no test |
| 13 | 12 | 10 | 7 | 10 | 9 | 14 | 7 | no test |
| 14 | 8 | 6 | 8 | 12 | 5 | 16 | 9 | no test |
| 15 | 10 | 8 | 10 | 15 | 7 | 30 | 22 | 32 |

Riaglas 09000ST is a PMMA injection molding type with an MVR of 2.3 measured at 230° C. and 3.80 kg bearing mass Grilamid TR55 and Grilamid TR70 are amorphous copolyamides based on lactam 12, isophthalic acid and 3,3'-dimethyl-4,4'-diaminodicyclohexylmethane with a glass transition temperature of approx. 160° C. or 190° C.

Grilamid TR90 is an amorphous polyamide based on dodecanoic diacid and 3,3'-dimethyl-4,4'-diaminodicyclohexylmethane with a glass transition temperature of 155° C.

EXAMPLE 17

For purposes of testing the bond adhesion, two-part DIN tensile bars were produced on an Arburg Allround 350-210-750 and subjected to a tensile test.

First, inserts were produced from the inventive block polyesteramides, on which Lexan 101, a polycarbonate made by GE Plastics Europe with an MVI of 6 (measured at 300° C. and 1.20 kg bearing mass) was sprayed on. The processing temperatures were selected such that a partial melting of the inserts on the common contact surface was possible.

The tear strength determined in the tensile test according to DIN 53455 equals 18 Mpa.

Surprisingly, a very good adhesion of the block polymers to polycarbonate could be achieved according to the invention.

EXAMPLE 18

On a ZSK-25, given a mass temperature between 200 and 240° C. and a rate of rotation in the range between 150 and 300 UPM and a throughput of 5-10 kg/h a) Grilamid L16 A (amine-terminated, low-viscosity PA-12) and Plexiglas 6N (PMMA by Röhm) without other additives in a ratio of 1:2, and b) 1 part Grilamid L16 A and 2 parts Plexiglas 6N are extruded, while adding 10% of a block polyester amide from the examples 6-9.

While in a) a non-granulatable, sharply pulsing strand resulted, or the compound even dripped from the discharge nozzle in the shape of elongated drops and thus could not be extracted, in extrusion b) a homogenous, non-pulsing strand with a smooth surface was formed, which could be granulated without a problem. Examination of the phase distribution via REM reveals that the dispersed polyamide phase in case a) is distributed as spheres or deformed cylinders with a diameter between 2 and 10 μm, while in case b) it is distributed substantially more homogenously, with domain sizes appreciably smaller 0.5 μm. [sic] This result clearly demonstrates the compatibility promoting effect of the inventive block copolymers in polyamide-PMMA blends.

EXAMPLE 19

On an apparatus for cable wrapping, a plastic optical fiber waveguide based on PMMA (Toray PFU FB 1000 L) was coated with the following structure:
inner layer: adhesion promoter from Example 6
outer layer: Grilamid L16 LM The stripping force for a semi-insulated fiber was measured in a tension-expansion experiment. On average, a force of 50-60 N had to be applied in order to strip the fiber from the cladding. Thus, a very good bond exists between the fiber and the cladding.

EXAMPLE 1 FOR COMPARISON

By coextrusion, a plastic optical fiber waveguide (Toray PFU FB 1000 L) was coated with the following structure:
inner layer: Grilamid L16 A as adhesion promoter
outer layer: Grilamid L16 LM The stripping force on the semi-insulated fiber was measured in a tension-expansion experiment. A force of 10 N had to be applied in order to strip the fiber from the cladding. The bond between the fiber and cladding is insufficient.

EXAMPLE 2 FOR COMPARISON

By coextrusion, a plastic optical fiber waveguide (Toray PFU FB 1000 L) was coated with the following structure:
inner layer: Lotader AX 8900 (Atofina, copolymer from ethylene, methylacrylate and glycidyl acrylate) as adhesion promoter
outer layer: Grilamid L16 LM The stripping force on the semi-insulated fiber was measured in a tension-expansion experiment. A force of 25 N had to be applied in order to strip the fiber from the cladding. The bond between the fiber and cladding is significantly weaker than in Example 18 and fails to satisfy the requirements of a tight fit greater than or equal to 50 N.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. Thermoplastic block copolymers of the general formula (A):

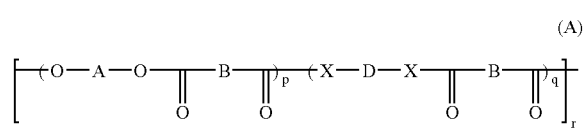

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

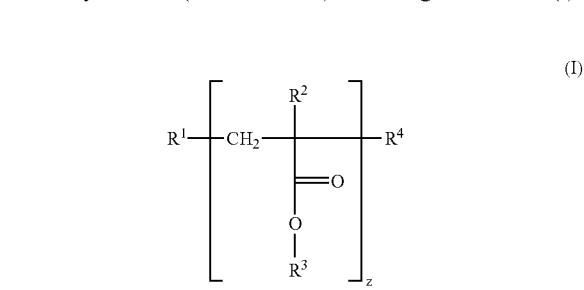

wherein z is an integer from 4 to 50 and $R^1$ is selected from the group consisting of —S—$R^5$—OH, —C($C_6H_5$)$_2$—$R^5$—OH, -and S—C(S)—N($C_2H_5$)$C_2H_4$—OH, $R^2$ is H, $CH_3$, $R_3$ is an alkyl residue with 1-12 C atoms, which can be halogenated, $R^4$ is a residue selected from the group consisting of (1), (2), and (3):

  (1)

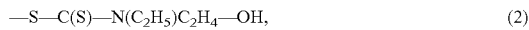  (2)

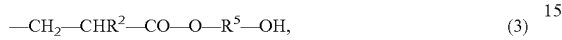  (3)

wherein $R^5$ is a residue selected from the group consisting of (4), (5) and (6):

(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms, (5) a bivalent aliphatic ether residue —$R^6$—O—$R^{6'}$, whose residues —$R^6$ and $R^{6'}$ together have 4-20 C atoms, (6) a bivalent polyether residue according to the general formula —($C_nH_{2n}O)_m$—$C_pH_{2p}$, wherein n=2-4, m≥1, and p=2-4, and the poly(meth)acrylate (I) is partly or completely imidized, (II) 30-90 weight percent of at least one polyamide dicarboxylic acid (HOOC—B—COOH) according to the general formula (IIa) or (IIb):

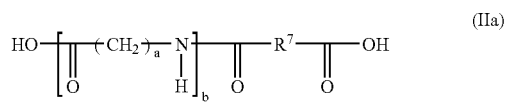  (IIa)

wherein a is an integer from 5 to 11 and b is an integer from 2 to 50, or

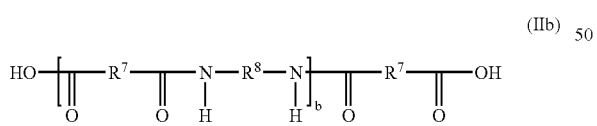  (IIb)

wherein b is an integer from 2 to 40, wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms, $R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms, (III) 1-20 weight percent of at least one diol or diamine according to Formula (III):

  (III)

wherein X is NH or O, and wherein D is selected from the group consisting of (7), (8), (9), (10), (11):

(7) a bivalent aliphatic hydrocarbon residue with 4 to 36 C atoms, which can be unsaturated, (8) an aliphatic olefin polymerisate with a molar mass of 500-4,000 g/mol, which can be unsaturated (9) a bivalent polyether residue according to the general formula —($C_nH_{2n}O)_m$—$C_pH_{2p}$, wherein n is an integer from 2-4, p is an integer from 2-4, and the molar mass of the polyether residue is 400-2,500 g/mol,

(10) a polyester residue according to the general Formula (IVa) or (IVb):

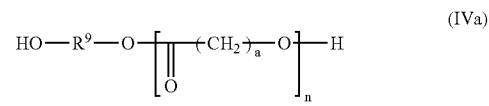  (IVa)

wherein a is an integer from 5 to 11 and n is an integer from 5 to 30, or

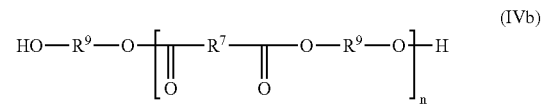  (IVb)

wherein n is an integer from 3 to 20, wherein, in Formula IVa or IVb, $R^9$ is an aliphatic or cycloaliphatic hydrocarbon residue with 2-36 carbon atoms, and $R^7$ is selected from the group consisting of a bivalent aliphatic hydrocarbon residue with 2-20 carbon atoms, a cycloaliphatic hydrocarbon with up to 36 C atoms, and an aliphatic aromatic hydrocarbon residue with 8-20 C atoms,

(11) an organic polysiloxane residue with a molar mass of 500-3,000 g/mol.

and wherein components I, II, and III add up to 100 weight percent.

2. Thermoplastic block copolymers according to claim 1, comprising

–30 to 60 weight percent of at least one poly(meth)acrylate diol (HO—A—OH) according to Formula I, –40 to 60 weight percent of at least one polyamidedicarboxylic acid (HOOC—B—COOH) according to the general Formula IIa or IIb and –1 to 10% of at least one diol or diamine according to Formula III, wherein the sum of components I, II, and III is 100 weight percent.

3. Thermoplastic block copolymers according to claim 1, wherein the polyamide segments have an average molar mass in the range between 500 and 5,000 g/Mol.

4. Thermoplastic block copolymers as claimed in claim 1, wherein the polyamide segments are built from monomers that are selected from the group consisting of lactams with 6 to 12 carbon atoms, α, ω-aminocarboxylic acids with 6 to 12 carbon atoms, aliphatic diamines with 2 to 10 carbon atoms, dicarboxylic acids with 2 to 44 carbon atoms, and aliphatic or cycloaliphatic diamines with 2 to 18 carbon atoms.

5. Thermoplastic block copolymers as claimed in claim 1, wherein the polyalkyl(meth)acrylates (I) are α, ω-functionalized polyalkyl(meth)acrylates which have average molar masses in the range between 600 and 5,000 g/Mol.

6. Thermoplastic block copolymers as claimed in claim 1, comprising as the diol or diamine in Formula III at least one of the compounds from the group consisting of:
butane diol, hexane diol, cyclohexane dimethanol, dodecane diol, dimer diol, hexamethylene diamine, dodecane diamine, 2,2,4- and 2,4,4-trimethylhexamethylenediamine, 3,3'-dimethyl-4,4'-diaminodicyclohexylmethane, 4,4'-diaminodicyclohexylmethane, polyethyleneglycol diol, polypropyleneglycol diol, polytetramethylene diols, polyethylene glycol diamines, polypropyleneglycol diamines, polytetramethylenediamines, polybutadiene diols and poly(butadiene-co-ethylene) diols, which can be hydrated as warranted, polycaprolactone diols, polyester diols based on aliphatic or aromatic dicarboxylic acids and aliphatic or cycloaliphatic $C_2$-$C_{36}$ diols and aromatic $C_6$-$C_{18}$ diols.

7. A method for producing thermoplastic block copolymers having thermoplastic block copolymers of the general formula (A):

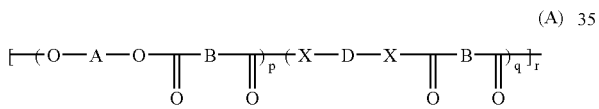

(A)

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

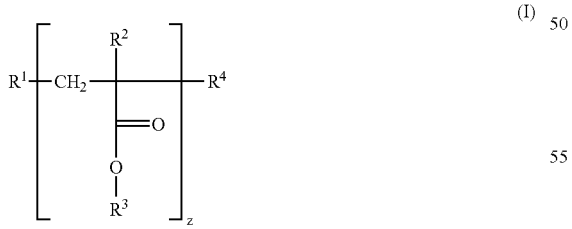

(I)

wherein
z is an integer from 4 to 50 and
$R^1$ is selected from the group consisting of —S—$R^5$—OH, —C($C_6H_5$)$_2$—$R^5$—OH, -and S—C(S)—N($C_2H_5$)$C_2H_4$—OH,
$R^2$ is H,$CH_3$,
$R^3$ is an alkyl residue with 1-12 C atoms, which can be halogenated, $R^4$ is a residue selected from the group consisting of (1), (2), and (3):

(1)

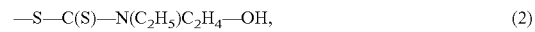

(2)

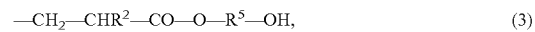

(3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues —$R^6$ and $R^{6'}$ together have 4-20 C atoms,
(6) a bivalent polyether residue according to the general formula —($C_nH_{2n}$O)$_m$—$C_pH_{2p}$,
wherein n=2-4, m≧1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

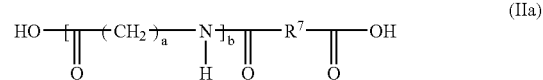

(IIa)

wherein
a is an integer from 5 to 11 and b is an integer from 2 to 50,
or

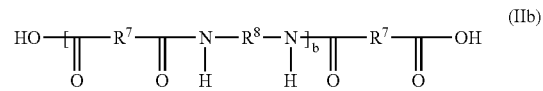

(IIb)

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms,
(III) 1-20 weight percent of at least one diol or diamine according to Formula (III):

(III)

wherein X is NH or O,
and wherein D is selected from the group consisting of (7), (8), (9), (10), (11):
(7) a bivalent aliphatic hydrocarbon residue with 4 to 36 C atoms, which can be unsaturated, (8) an aliphatic olefin polymerisate with a molar mass of 500-4,000 g/mol, which can be unsaturated
(9) a bivalent polyether residue according to the general formula —$(C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

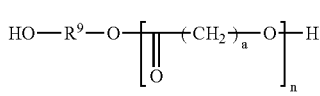

(IVa)

wherein a is an integer from 5 to 11 and
n is an integer from 5 to 30,
or

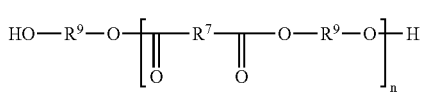

(IVb)

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic hydrocarbon residue with 2-20 carbon atoms, a cycloaliphatic hydrocarbon with up to 36 C atoms, and an aliphatic aromatic hydrocarbon residue with 8-20 C atoms, and
(11) an organic polysiloxane residue with a molar mass of 500-3,000 g/mol;
comprising the steps of
in a first polymerization or polycondensation step, at temperatures between 180 to 300° C., given a pressure between atmospheric pressure and $3 \times 10^6$ Pas (30 bar), polyamide or copolyamide blocks with an average molar mass in the range from 500 to 5,000 g/Mol with an amino end group concentration of at most 50 mMol/kg, are produced, and degassed in a second step at least 0.5 hours under a pressure between 50 mbar and atmospheric pressure for purposes of reducing the water content;
α,ω-functionalized polyalkyl(meth)acrylate diols with an average molar mass in the range between 600 and 5,000 g/Mol, are added together with all or part of the diol component III in case X=O in Formula III, and
the reaction mixture is condensed into the high-molecular block copolymer (A) at a temperature between 180 and 300° C. in the presence of between 0.05 and 0.2 weight percent a catalyst under reduced pressure in a further polycondensation step; and
discharged or further processed into molding bodies.

8. A thermoplastic product constructed, at least in part, from thermoplastic block copolymers of the general formula (A):

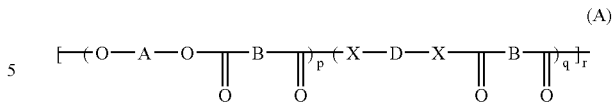

(A)

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

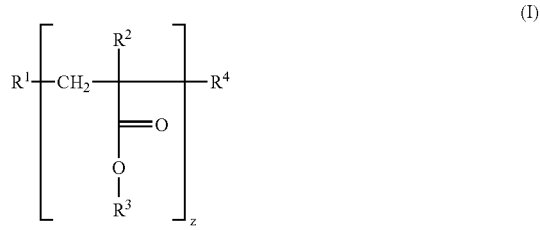

(I)

wherein
z is an integer from 4 to 50 and
$R^1$ is selected from the group consisting of —S—$R^5$—OH, —C$(C_6H_5)_2$—$R^5$—OH, -and S—C(S)—N$(C_2H_5)$ $C_2H_4$—OH,
$R^2$ is H,CH$_3$,
$R^3$ is an alkyl residue with 1-12 C atoms, which can be halogenated,
$R^4$ is a residue selected from the group consisting of (1), (2), and (3):

—$R^5$—OH (1)

—S—C(S)—N$(C_2H_5)C_2H_4$—OH, (2)

—CH$_2$—CHR$^2$—CO—O—$R^5$—OH, (3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues $R^6$ and $R^{6'}$ together have 4-20 C atoms,
(6) a bivalent polyether residue according to the general formula —$(C_nH_{2n}O)_m$—$C_pH_{2p}$,
wherein n=2-4, m≧1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

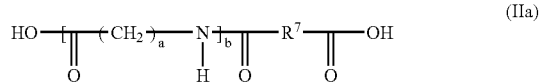

(IIa)

wherein
a is an integer from 5 to 11 and b is an integer from 2 to 50,
or

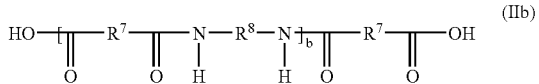

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms,
(III) 1-20 weight percent of at least one diol or diamine according to Formula (III):

wherein X is NH or O,
and wherein D is selected from the group consisting of (7), (8), (9), (10), (11):
(7) a bivalent aliphatic hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula —$(C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

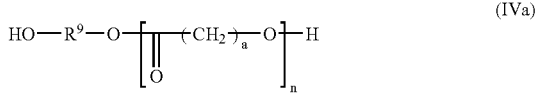

wherein a is an integer from 5 to 11 and
n is an integer from 5 to 30,
or

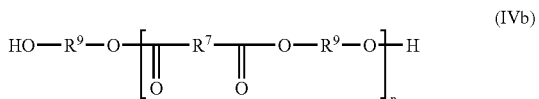

wherein n is an integer from 3 to 20,
wherein, in Formula IVa or IVb, $R^9$ is an aliphatic or cycloaliphatic hydrocarbon residue with 2-36 carbon atoms, and $R^7$ is selected from the group consisting of a bivalent aliphatic, potentially unsaturated, hydrocarbon residue with 2-20 carbon atoms, a cycloaliphatic hydrocarbon with up to 36 C atoms, and an aliphatic aromatic hydrocarbon residue with 8-20 C atoms, and
(11) an organic polysiloxane residue with a molar mass of 500-3,000 g/mol.

9. The thermoplastic product of claim 8 wherein the product is chosen from the group consisting of fibers, films, molded bodies, and hot-melt adhesives.

10. An adhesion or compatibility promoter in coextrudates based on (co)polyamide and polyalkyl(meth)acrylate or (co)polyamide and polycarbonate thermoplastic block copolymers of the general formula (A):

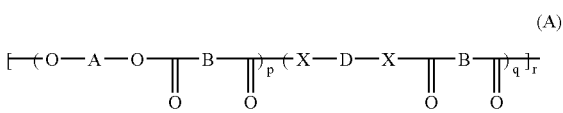

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

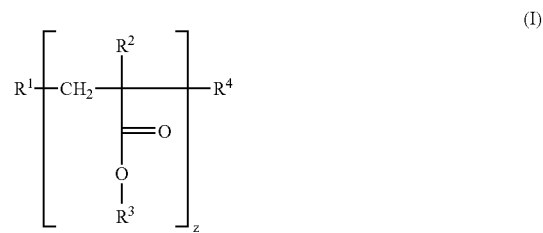

wherein
z is an integer from 4 to 50 and
$R^1$ is selected from the group consisting of —S—$R^5$—OH, —$C(C_6H_5)_2$—$R^5$—OH, -and S—C(S)—$N(C_2H_5)$ $C_2H_4$—OH,
$R^2$ is H,$CH_3$,
$R^3$ is an alkyl residue with 1-12 C atoms, which can be halogenated,
$R^4$ is a residue selected from the group consisting of (1), (2), and (3):

—$R^5$—OH (1)

—S—C(S)—$N(C_2H_5)C_2H_4$—OH, (2)

—$CH_2$—$CHR^2$—CO—O—$R^5$—OH, (3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues —$R^6$ and $R^{6'}$ together have 4-20 C atoms, (6) a bivalent polyether residue according to the general formula —$(C_nH_{2n}O)_m$—$C_pH_{2p}$,
wherein n=2-4, m≧1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

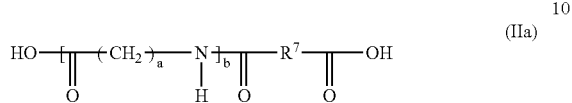

wherein
a is an integer from 5 to 11 and b is an integer from 2 to 50,
or

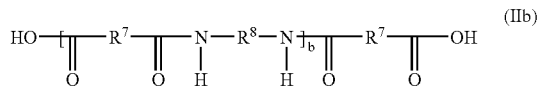

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms,
(III) 1-20 weight percent of at least one diol or diamine according to Formula (III):

HX—D—XH  (III)

wherein X is NH or O,
and wherein D is selected from the group consisting of (7), (8), (9), (10), (11):
(7) a bivalent aliphatic hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula —$(C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

wherein a is an integer from 5 to 11 and
n is an integer from 5 to 30,
or

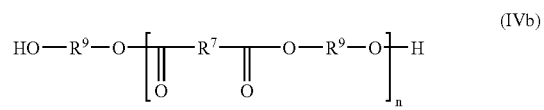

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic hydrocarbon residue with 2-20 carbon atoms, a cycloaliphatic hydrocarbon with up to 36 C atoms, and an aliphatic aromatic hydrocarbon residue with 8-20 C atoms,
(11) an organic polysiloxane residue with a molar mass of 500-3,000 g/mol.
and wherein components I, II, and III add up to 100 weight percent.

11. An optical fiber wave guide comprising a fiber cladding and a sheath and including as a bonding material a thermoplastic block copolymer of the general formula (A):

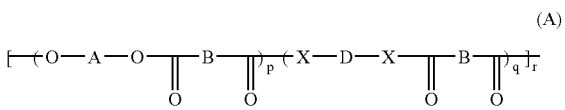

wherein
p is an integer from 1 to 20,
q is an integer from 1 to 10, and
r is an integer from 1 to 10,
containing the following segments (I), (II) and (III):
(I) 15-70 weight percent of at least one poly(meth) acrylate diol (HO—A—OH) according to Formula (I):

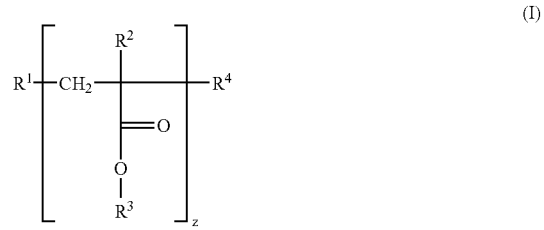

wherein
z is an integer from 4 to 50 and
$R^1$ is selected from the group consisting of —S—$R^5$—OH, —$C(C_6H_5)_2$—$R^5$—OH, -and S—C(S)—$N(C_2H_5)$ $C_2H_4$—OH,
$R^2$ is H,$CH_3$,
$R^3$ is an alkyl residue with 1-12 C atoms, which can be halogenated, $R^4$ is a residue selected from the group consisting of (1), (2), and (3):

$$—R^5—OH \quad (1)$$

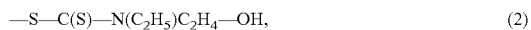
$$—S—C(S)—N(C_2H_5)C_2H_4—OH, \quad (2)$$

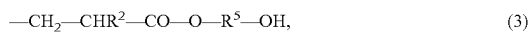
$$—CH_2—CHR^2—CO—O—R^5—OH, \quad (3)$$

wherein
$R^5$ is a residue selected from the group consisting of (4), (5) and (6):
(4) a bivalent aliphatic, potentially unsaturated, hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue $—R^6—O—R^{6'}$, whose residues $—R^6$ and $R^{6'}$ together have 4-20 C atoms,
(6) a bivalent polyether residue according to the general formula $—(C_nH_{2n}O)_m—C_pH_{2p}$,
wherein n=2-4, m≥1, and p=2-4,
and the poly(meth)acrylate (I) is partly or completely imidized,
(II) 30-90 weight percent of at least one polyamide dicarboxylic acid (HOOC—B—COOH)

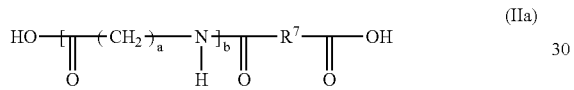
(IIa)

according to the general formula (IIa) or (IIb):
wherein
a is an integer from 5 to 11 and b is an integer from 2 to 50,
or

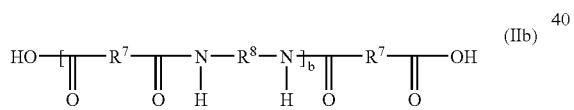
(IIb)

wherein
b is an integer from 2 to 40,
wherein, in Formulas IIa or IIb, $R^7$ is selected from the group consisting of a bivalent aliphatic, unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue $—R^6—O—R^{6'}—$, whose residues $R^6$ and $R^{6'}$ together have 4-20 C atoms,
(III) 1-20 weight percent of at least one diol or diamine according to Formula (III):

$$HX—D—XH \quad (III)$$

wherein X is NH or O,
and wherein D is selected from the group consisting of (7), (8), (9), (10), (11):

(7) a bivalent aliphatic, potentially cycloaliphatic, hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula $—(C_nH_{2n}O)_m—C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

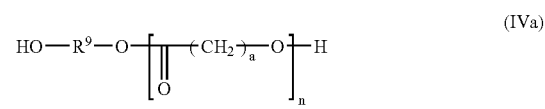
(IVa)

wherein a is an integer from 5 to 11 and
n is an integer from 5 to 30,
or

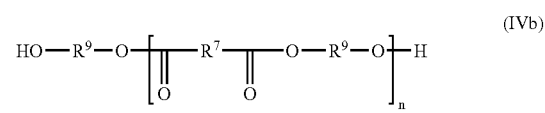
(IVb)

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic, potentially unsaturated, hydrocarbon residue with 2-20 carbon atoms, a cycloaliphatic hydrocarbon with up to 36 C atoms, and an aliphatic aromatic hydrocarbon residue with 8-20 C atoms,
(11) an organic polysiloxane residue with a molar mass of 500-3,000 g/mol.
and wherein components I, II, and III add up to 100 weight percent.

12. The optical fiber waveguide of claim 11 wherein the sheath consists of polyamides or copolyamides or blends thereof with a melting point below 220° C., and the fiber cladding consists of a plastic chosen from the group consisting of vinylidene fluoride, tetrafluoroethene, hexafluoropropene, methacrylic acid tetrafluoropropylester, methacrylic acid pentafluoropropylester, methacrylic acid trifluoroethylester, methacrylic acid heptadecafluorodecylester and blends or copolymerisates of these substances.

13. A thermoplastic multilayer compound consisting of
(a) at least one layer of a molding material based on (co)polyamide,
(b) at least one layer of a molding material consisting of a thermoplastic material from the group consisting of polyalkyl(meth)acrylates and polycarbonates—whereby the polyalkyl(meth)acrylates are homopolymers or copolymers in which up to 50 Mol % of the alkyl(meth)acrylate can be replaced by other monomers from the group consisting of butylmethacrylate, butylacrylate, methacrylic acid, itaconic acid, styrol, maleic acid anhydride—fluoropolymers or the perfluorinated polymers or blends of these compounds and (c) at least one layer between (a) and (b) which is based on a blend of the polymers that form layers (a) and (b), whereby at least part of the blend or the whole blend can consist of the thermoplastic block copolymers of the general formula (A):

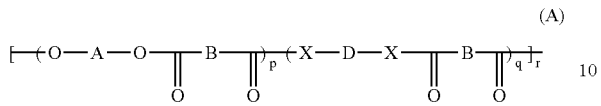
(A)

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

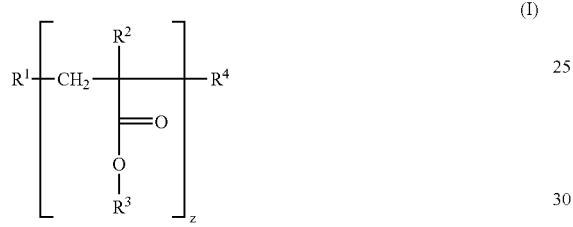
(I)

wherein
z is an integer from 4 to 50 and
$R^1$ is selected from the group consisting of —S—$R^5$—OH, —C($C_6H_5$)$_2$—$R^5$—OH, -and S—C(S)—N($C_2H_5$)$C_2H_4$—OH,
$R^2$ is H,$CH_3$,
$R^3$ is an alkyl residue with 1-12 C atoms, which can be halogenated,
$R^4$ is a residue selected from the group consisting of (1), (2), and (3):

—$R^5$—OH (1)

—S—C(S)—N($C_2H_5$)$C_2H_4$—OH, (2)

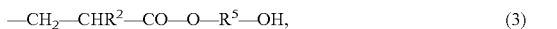
—$CH_2$—$CHR^2$—CO—O—$R^5$—OH, (3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues —$R^6$ and $R^{6'}$ together have 4-20 C atoms,
(6) a bivalent polyether residue according to the general formula —($C_nH_{2n}O)_m$—$C_pH_{2p}$,
wherein n=2-4, m≧1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

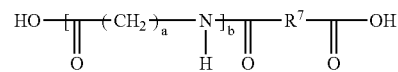
(IIa)

wherein
a is an integer from 5 to 11 and b is an integer from 2 to 50,
or

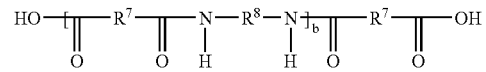
(IIb)

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms,
(III) 1-20 weight percent of at least one diol or diamine according to Formula (III):

HX—D—XH (III)

wherein X is NH or O,
and wherein D is selected from the group consisting of (7), (8), (9), (10), (11):
(7) a bivalent aliphatic hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula —($C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

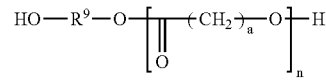
(IVa)

wherein a is an integer from 5 to 11 and
n is an integer from 5 to 30,
or

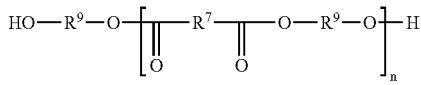
(IVb)

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic, potentially unsaturated, hydrocarbon residue with 2-20 carbon atoms, a cycloaliphatic hydrocarbon with 2-36 C atoms, and an aliphatic aromatic hydrocarbon residue with 8-20 C atoms,
(11) an organic polysiloxane residue with a molar mass of 500-3,000 g/mol.
and wherein components I, II, and III add up to 100 weight percent.

14. Thermoplastic multilayer compound claimed in claim 13, wherein the at least one layer of a molding material based on (co)polyamide (a) is a layer of a molding material based on a polyamide chosen from the group consisting of polyamide 12, polyamide 12 copolymers, a polymer alloy that builds polyamide 12, a layer of an amorphous polyamide, and a polymer alloy based on an amorphous polyamide.

15. Multilayer compound as claimed in claim 12, wherein the at least one layer of a molding material based on (co)polyamide is an amorphous polyamide from the monomer building blocks of terephthalic acid and the isomer blend of 2,2,4- and 2,4,4-trimethylhexamethylene diamine, the copolyamide from isophthalic acid, 3,3'-dimethyl-4,4'-diaminodicyclohexylmethane and lauric lactam as well as the polyamide from 1,12-dodecanoic dicarboxylic acid and 4,4'-diaminodicyclohexylmethane or 3,3'-dimethyl-4,4'-diaminodicyclohexylmethane.

16. Thermoplastic multilayer compound claimed in claim 13, wherein the polyalkyl(meth)acrylate of layer (b) is a polyalkylmethacrylate with 1 to 12 carbon atoms in the carbon chain of the alkyl residue.

17. Thermoplastic multilayer compound of claim 16, wherein layer (b) is polymethylmethacrylate.

18. Thermoplastic multilayer compound of claim 16, wherein layer (b) is polybutylmethacrylate.

19. A thermoplastic multilayer compound having thermoplastic block copolymers of the general formula (A):

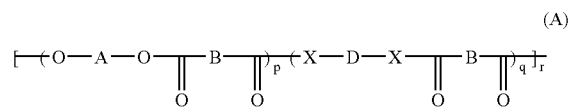
(A)

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

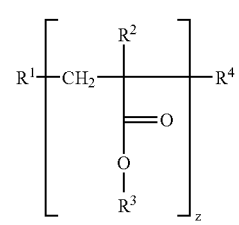
(I)

wherein
z is an integer from 4 to 50 and
$R^1$ is selected from the group consisting of —S—$R^5$—OH, —C($C_6H_5$)$_2$—$R^5$—OH, -and S—C(S)—N($C_2H_5$)$C_2H_4$—OH,
$R^2$ is H,$CH_3$,
$R^3$ is an alkyl residue with 1-12 C atoms, which can be halogenated,
$R^4$ is a residue selected from the group consisting of (1), (2), and (3):

—$R^5$—OH (1)

—S—C(S)—N($C_2H_5$)$C_2H_4$—OH, (2)

—$CH_2$—$CHR^2$—CO—O—$R^5$—OH, (3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues —$R^6$ and $R^{6'}$ together have 4-20 C atoms,
(6) a bivalent polyether residue according to the general formula —($C_nH_{2n}O$)$_m$—$C_pH_{2p}$,
wherein n=2-4, m≧1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

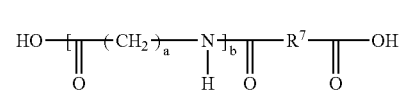
(IIa)

wherein
a is an integer from 5 to 11 and b is an integer from 2 to 50,
or

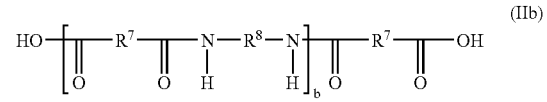
(IIb)

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms, $R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms, (III) 1-20 weight percent of at least one diol or diamine according to Formula (III):

HX—D—XH    (III)

wherein X is NH or O,
and wherein D is selected from the group consisting of (7), (8), (9), (10), (11):
(7) a bivalent aliphatic hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula —$(C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

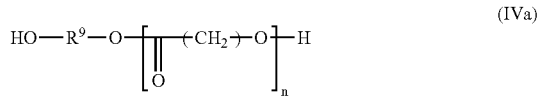

(IVa)

wherein a is an integer from 5 to 11 and
n is an integer from 5 to 30,
or

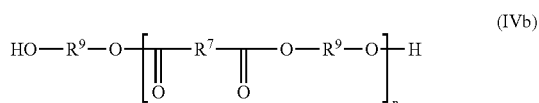

(IVb)

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic, potentially unsaturated, hydrocarbon residue with 2-20 carbon atoms, a cycloaliphatic hydrocarbon with up to 36 C atoms, and an aliphatic aromatic hydrocarbon residue with 8-20 C atoms,
(11) an organic polysiloxane residue with a molar mass of 500-3,000 g/mol.
and wherein components I, II, and III add up to 100 weight percent used as a housing or housing part of a mobile radiotelephone.

20. A corrugated multilayer polymer tubing comprising thermoplastic block copolymers of the general formula (A):

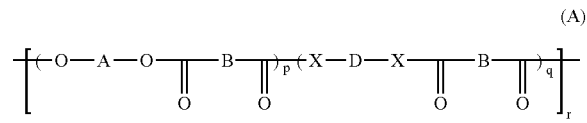

(A)

wherein
p is an integer from 1 to 20,
q is an integer from 1 to 10, and
r is an integer from 1 to 10,
containing the following segments (I), (II) and (III):
(I) 15-70 weight percent of at least one poly(meth)acrylate diol (HO—A—OH) according to Formula (I):

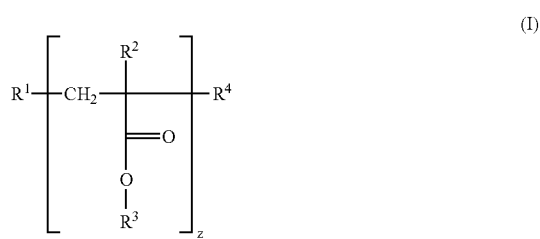

(I)

wherein
z is an integer from 4 to 50 and
$R^1$ is selected from the group consisting of —S—$R^5$—OH, —$C(C_6H_5)_2$—$R^5$—OH, -and S—C(S)—N($C_2H_5$)$C_2H_4$—OH,
$R^2$ is H,$CH_3$,
$R^3$ is an alkyl residue with 1-12 C atoms, which can be halogenated,
$R^4$ is a residue selected from the group consisting of (1), (2), and (3):

—$R^5$—OH    (1)

—S—C(S)—N($C_2H_5$)$C_2H_4$—OH,    (2)

—$CH_2$—$CHR^2$—CO—O—$R^5$—OH,    (3)

wherein
$R^5$ is a residue selected from the group consisting of (4), (5) and (6):
(4) a bivalent aliphatic hydrocarbon residue with 2 to 20 C atoms, a cycloaliphatic hydrocarbon residue with up to 36 C atoms or an aliphatic aromatic hydrocarbon residue with 8 to 20 C atoms,
(5) a bivalent aliphatic ether residue —$R^6$—O—$R^{6'}$, whose residues $R^6$ and $R^{6'}$ together have 4-20 C atoms,
(6) a bivalent polyether residue according to the general formula —$(C_nH_{2n}O)_m$—$C_pH_{2p}$,
wherein n=2-4, m≥1, and p=2-4,
and the poly(meth)acrylate (I) is partly or completely imidized,
(II) 30-90 weight percent of at least one polyamide dicarboxylic acid (HOOC—B—COOH) according to the general formula (IIa) or (IIb):

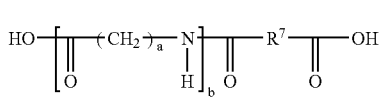
(IIa)

wherein
a is an integer from 5 to 11 and b is an integer from 2 to 50,
or

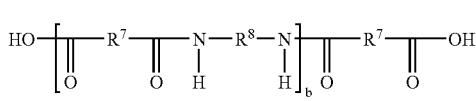
(IIb)

wherein
b is an integer from 2 to 40,
wherein, in Formulas IIa or IIb, $R^7$ is selected from the group consisting of a bivalent aliphatic unsaturated hydrocarbon residue with 2-20 carbon atoms, a cycloaliphatic hydrocarbon with up to 36 C atoms, and an aliphatic aromatic hydrocarbon residue with 8-20 C atoms,
$R^8$ is selected from the group consisting of a bifunctional aliphatic hydrocarbon residue with 2-12 C atoms, a cycloaliphatic hydrocarbon residue with 6-20 C atoms, an aliphatic aromatic hydrocarbon residue with 8-20 C atoms and a bivalent aliphatic ether residue —$R^6$—O—$R^{6'}$—, whose residues $R^6$ and $R^{6'}$ together have 4-20 C atoms,
(III) 1-20 weight percent of at least one diol or diamine according to Formula (III):

(III)

wherein X is NH or O,
and wherein D is selected from the group consisting of (7), (8), (9), (10), (11):
(7) a bivalent aliphatic hydrocarbon residue with 4 to 36 C atoms, which can be unsaturated,
(8) an aliphatic olefin polymerisate with a molar mass of 500-4,000 g/mol, which can be unsaturated
(9) a bivalent polyether residue according to the general formula —$(C_nH_{2n}O)_m$—$C_pH_{2p}$,
wherein n is an integer from 2-4,
p is an integer from 2-4, and
the molar mass of the polyether residue is 400-2,500 g/mol,
(10) a polyester residue according to the general Formula (IVa) or (IVb):

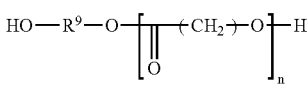
(IVa)

wherein a is an integer from 5 to 11 and an integer from 5 to 30,
or

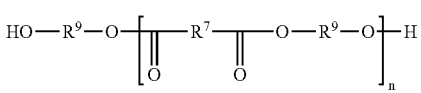
(IVb)

wherein n is an integer from 3 to 20,
wherein, in Formula IVa or IVb, $R^9$ is an aliphatic or cycloaliphatic hydrocarbon residue with 2-36 carbon atoms, and
$R^7$ is selected from the group consisting of a bivalent aliphatic hydrocarbon residue with 2-20 carbon atoms, a cycloaliphatic hydrocarbon with up to 36 C atoms, and an aliphatic aromatic hydrocarbon residue with 8-20 C atoms,
(11) an organic polysiloxane residue with a molar mass of 500-3,000 g/mol.
and wherein components I, II, and III add up to 100 weight percent.

21. Corrugated multilayer tubing of claim 20, wherein the tubing consists of at least one inner layer of thermoplastically processed fluoropolymers, an outer layer of polyamide, and an intermediate adhesion promotion layer based on the thermoplastic block copolymers.

22. Corrugated multilayer tubing as claimed in claim 20, wherein the fluoropolymers are selected from the group consisting of polyvinylidene fluoride (PVDF), fluoropolymers based on tetrafluoroethylene (TFE), hexafluoropropylene (HFP), and vinylidene fluoride (VDF), and or fluoropolymers based on tetrafluoroethylene (TFE), perfluoromethylvinylether (PMVE) and vinylidene fluoride (VDF).

23. Corrugated multilayer tubing of claim 20, wherein the tubing is produced by a method selected from the group consisting of injection molding extrusion, calendering, and sealing.

* * * * *